Dec. 11, 1928.
J. LANSINGER
1,695,194
LIQUID PRESSURE BRAKE
Filed May 11, 1927 2 Sheets-Sheet 1
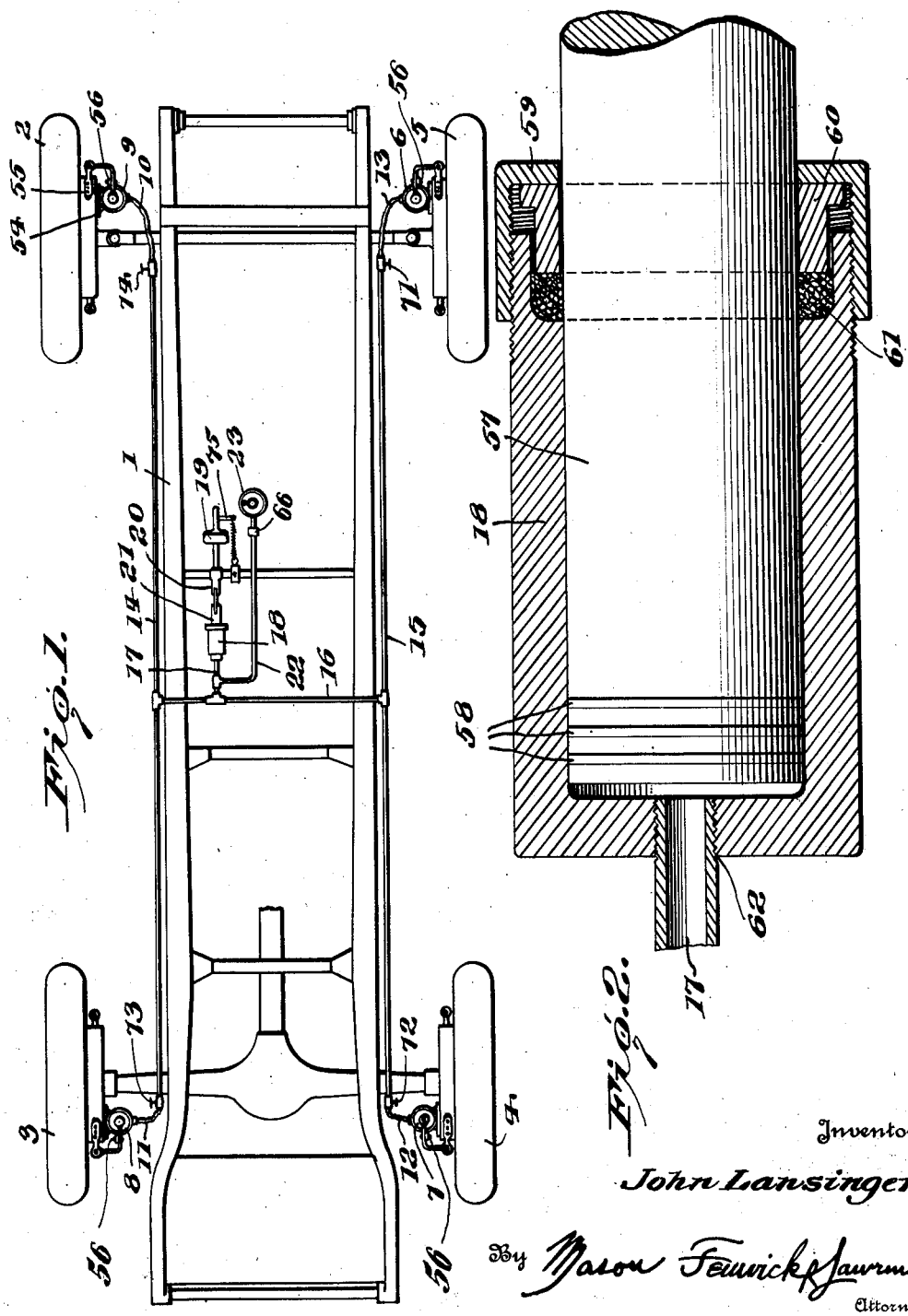

Dec. 11, 1928.
J. LANSINGER
1,695,194
LIQUID PRESSURE BRAKE
Filed May 11, 1927    2 Sheets-Sheet 2
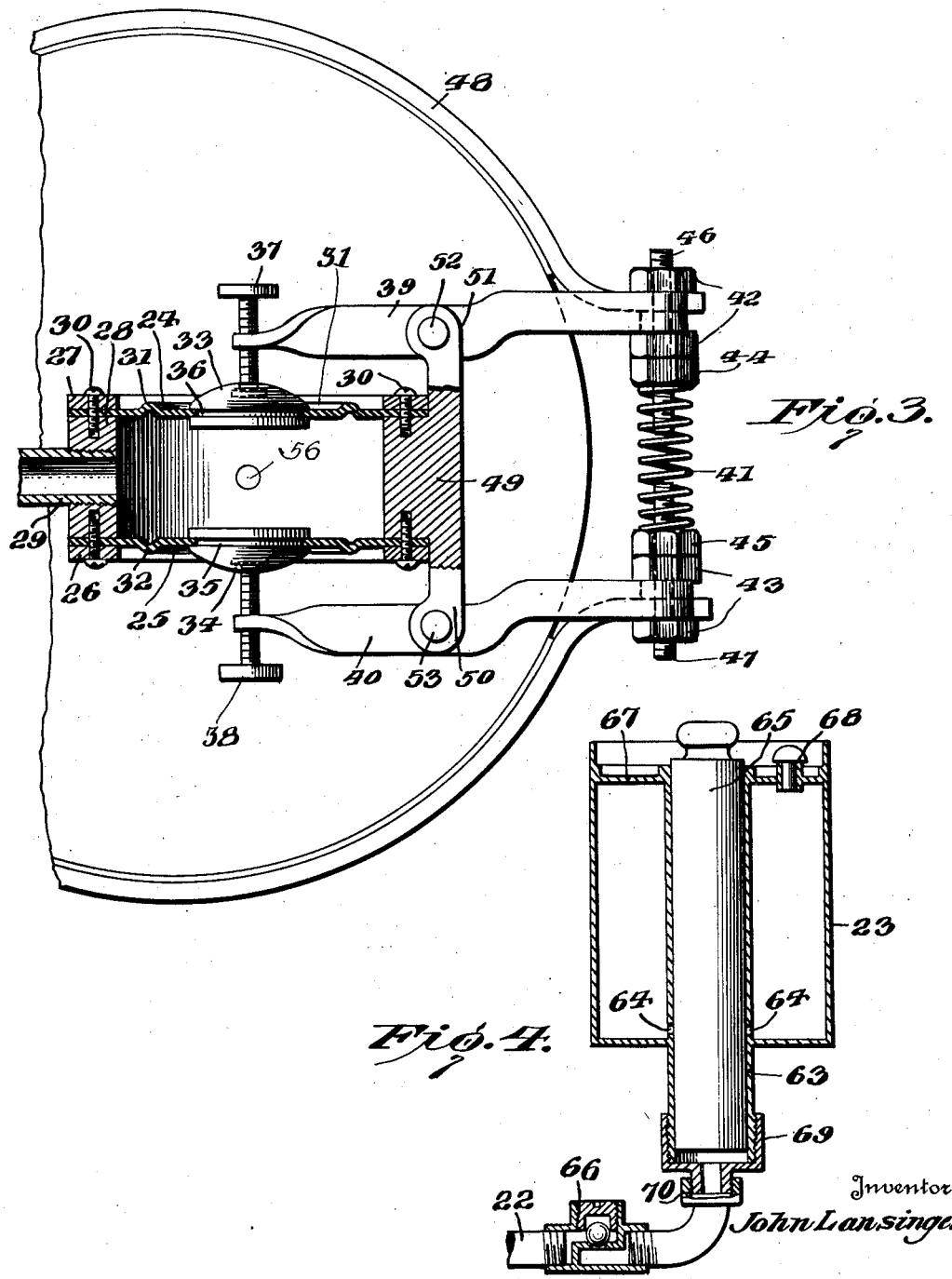

Patented Dec. 11, 1928.

1,695,194

UNITED STATES PATENT OFFICE.

JOHN LANSINGER, OF CLARKS SUMMIT, PENNSYLVANIA

LIQUID-PRESSURE BRAKE.

Application filed May 11, 1927. Serial No. 190,615.

This invention relates to improvements in liquid pressure brakes, particularly in a type of brake which will function in conjunction with a four-wheel pressure diaphragm brake system.

An object of this invention is to provide a diaphragm brake system operated by a double diaphragm designed for high pressure, the pressure being preferably created by an oil system which is cushioned by the pressure delivered from a master cylinder, the prime pressure being created by the exertion of the foot on a lever, commonly found in automobiles.

Another object of this invention is to provide a diaphragm brake system which will function to practically reduce to a minimum the liquid in the casings so as to create a very high pressure by means of the expansion of the diaphragm through the medium of foot pressure on the master cylinder.

A further object of this invention is to provide a brake system which can be easily dismounted without the necessity of removing the wheel of the machine or jacking up the car; at the same time the construction of the diaphragm brake pressure oil system, according to this invention, eliminates all rubber and pistons and forms a high pressure brake system on each of the four wheels.

One of the principal objects of this invention is to provide a diaphragm oil pressure brake device which will function to eliminate all cylinder pistons, and packings of rubber washers, the only moving part being the diaphragm which is made of flexible material having a double expansion and provided with sealing means at all times, making it much more reliable than other brake systems which are considerably complicated, through the medium of liquid pressure with its attendant requirement of removing parts, such as pistons, packings and the like. No leaky pistons can occur on the diaphragm system as herein set forth.

The diaphragm brake system, according to this invention, will function to operate on an expansion or contraction in a manner which other liquid brakes are not adapted to, in that the diaphragms in this invention are expanded by a specially constructed high pressure master cylinder. Each diaphragm on the wheel is equipped with a shut-off not found in other systems, thereby greatly increasing the braking efficiency, also one or more of the wheel diaphragms in this invention can be closed off in case of an emergency without seriously decreasing the efficiency of the braking system.

Other objects of this invention will appear from the following detailed description of the device and as disclosed in the two sheets of drawings herewith made a part of this application.

In the drawings—

Figure 1 represents a diagrammatic plan view of the diaphragm brake system disclosing the diaphragms in operative relationship with the four wheels of a vehicle.

Figure 2 illustrates a sectional view of the master cylinder and piston.

Figure 3 represents a sectional view of the flexible diaphragm in assembled relationship with the adjustable features thereof.

Figure 4 illustrates a vertical sectional view of the oil tank.

Numeral 1 represents the frame of an automobile having connected thereto in the usual manner four wheels 2, 3, 4, and 5. Suitably positioned in relationship to the frame and wheels is a diaphragm brake system operated by a double diaphragm 6, 7, 8 and 9, located adjacent each wheel. From each diaphragm extends a flexible tubing as at 10, 11, 12 and 13, which, in turn, are adapted to connect in open communication with pressure lines 14, and 15, located on each side of the vehicle. At a suitable location along the pressure lines 14 and 15 and in open communication therewith is positioned a cross pressure line 16 from which extends a line 17 to a master cylinder or pump 18 which is operated from a foot lever pressure as at 19 through lever 20 and piston 21. Leading from the pressure line extension 17 and in open communication therewith is an oil line 22 leading to an oil or replenishing tank 23. The chamber located adjacent each wheel is preferably constructed having a pair of diaphragm portions 24 and 25 of suitable flexible material, positioned parallel and spaced from each other. The diaphragm portions are preferably circular in shape and held rigidly in spaced relationship by means of suitable clamping rings 26 and 27 and collar portion 28, having suitable openings therein as at 29 for receiving the threaded end of the flexible tubing, the rings and collar portion being firmly connected together by means of suitable machine screws or otherwise, such as 30. The diaphragms 24 and 25 are formed of sufficient material for allowing a desired flexibility as clearly shown at 31 and 32. The diaphragm device adjacent each wheel in this invention is preferably of a double diaphragm construction in order to allow for a high pressure, the pressure being created by an oil system, the oil being supplied from the oil replenishing tank 23, the cushioning effect being brought about by the pressure delivered from a master cylinder or pump 18, which receives its functioning pressure through the operation of a foot pedal 19 within the automobile. The diaphragms are constructed as clearly illustrated in Figure 3 so as to be properly positioned in the center of the casing on which they are mounted.

The principle involved is the elimination of the liquids, to a large extent, required in the casings, a very high pressure being possible through the use of a small amount of liquid by means of expansion of the diaphragms, primarily brought about by a foot pressure upon the master cylinder 18, the diaphragms 24 and 25 as they expand functioning to force outwardly pressure head elements 33 and 34 which extend through openings in the diaphragms and are adapted to be firmly held in connection with the diaphragms by means of grooved sections 35 and 36. The head portions 33 and 34 are provided with suitable adjusting screws 37 and 38, which function to adjustably support crank or lever arm portions 39 and 40 which are, in turn, connected to the brake bands of the wheels in some suitable manner, such as through a device disclosed in Figure 3, wherein a brake pressure is brought about by a reaction of a pressure from a spring 41, mounted on the bell cranks. At each end of the spring is a series of adjusting elements such as adjusting nuts 42 and 43, and lock nuts 44 and 45, the threaded spindle elements 46 and 47 being adapted to receive the brake band 48 on the wheel drum, thereby providing a device for adjusting distances, that is, the expansion distance of the diaphragms and the bands on the drums of the wheel. The bands and diaphragms are arranged in such a manner that the brakes may be removed without the necessity of removing the wheel itself or jacking up the car. A yoke portion 49 is preferably integrally formed from the collar portion 28 having suitable extensions 50 and 51 for pivotally mounting the crank or lever arms 39 and 40 thereto as at 52 and 53.

The construction of the brake diaphragm device, as disclosed in Figure 3, clearly sets forth a system in which all rubber packings, pistons and the like have been eliminated, and a closed chamber formed by diaphragms on each wheel, a high pressure brake system is therefore provided for each of the four wheels, the diaphragm device being connected to the wheel in each case by suitably located set screws or other fastening means as at 54 and 55, the pressure being delivered to the diaphragm as above described through a protected, reinforced flexible tubing as at 10, 11, 12 and 13, provided with metal threaded end portions for connecting with the collar element 28 in each instance. Each diaphragm casing is provided with a suitable tap plug 56 for the purpose of releasing air that may accumulate in the line. The line elements may be made from any suitable tubing such as copper, that is, from the master cylinder 18 to the flexible tubing sections.

Each diaphragm is preferably equipped with suitable head portions similar to the elements 33 and 34 disclosed in Figure 3, which function when the diaphragm expands to press against the crank elements 39 and 40 which, in turn, function to pivot on lubricated pivot portions similar to 52 and 53 in each case, the pivots being located between the head portions in the diaphragms and the brake extensions.

Figure 2 illustrates a master cylinder or pump in which a high pressure may be brought about through the operation of a foot lever 19. The stroke of this pump under ordinary conditions would be about five inches, but it is understood that the size of the master cylinder can be varied without affecting the merits of this invention. Rubber flare washers are entirely eliminated in this construction, the piston portion 57 being fitted with a plurality of brass rings as at 58, which function to move in a cylinder portion 18 made of any suitable material such as cast iron, thereby providing a pump or master cylinder having a minimum of leakage and assuring long life, at the same time functioning to produce a high pressure when desired. The forward end of the cylinder is provided with a retaining cap portion 59 which is adapted to be brought into threaded and screwed relationship with the open end of the cylinder portion 18, and within the cap portion is adapted to be located packing elements 60 and suitable packing 61, the arrangement in this respect being considerably different from that found in the ordinary master cylinder. The head or cap portion 59 may be made of bronze or brass and function to act as a guide element, as well as a packing ring, and eliminates the chance of any foreign matter entering the system. The packing ring may also be formed from brass or other suitable material. At the rear end of the master cylinder is located a threaded opening 62 for receiving the line element 17. The construction of the master cylinder herewith specified provides a device for producing high pressure and is considerably more efficient than cylinders now used in connection with liquid brake systems of other types.

Figure 4 illustrates a preferred form of oil tank or replenishing device as at 23. The tank is ordinarily formed to hold about a pint of liquid for use in a diaphragm oil brake system and the master cylinder. However, it is to be understood that the size and capacity of the tank may vary without affecting the merits of this invention.

The tank 23 is preferably provided with a cylinder portion 63 having a plurality of holes therein as at 64 at the lower end of the tank 23. The cylinder 63 is adapted to extend a suitable distance approximately two inches, below the tank portion 23, while a plunger 65 is slidably positioned within the cylinder 63 in such a manner that when the plunger or piston 65 is elevated to a clearance of the holes 64, the liquid will flow into the lower portion of the cylinder; then, by a downward stroke of the plunger 65, the holes 64 are closed off causing a closed chamber of approximately two inches of liquid within the lower portion of the cylinder, while with the completion of the downward stroke of the piston 65, the liquid is forced into the line 22 through a check portion 66 which functions to securely lock the liquid in the line, thereby eliminating the necessity for using a hand valve and a threaded valve seep commonly required in other systems which are obviously subject to the stripping of threads and leakage.

The type of check used in this invention also functions to keep the lines free from air to a large extent. There is little possibility of air entering the lines with the type of tank used in this invention, and at the same time the liquid can be easily replenished in the lines almost immediately without long delay common in other systems. The oil tank portion 23 is formed having a usual cover portion 67 and a filler plug and vent as at 68 for supplying oil to the tank. The lower end of the cylinder 63 is preferably formed having a double ended threaded cap portion 69, the line connections and ball check valve being suitably attached thereto as at 70.

Shut-off valves in this system are provided at 71, 72, 73 and 74.

In operation, this diaphragm oil pressure brake system provides an efficient mechanical means for applying brakes to the four wheels at one time, or separately as may be desired. The diaphragm used in connection with this invention is constructed in such a manner that the diaphragms themselves move only against their pressure heads that rest upon the pressure diaphragms, which are, in turn, held by the cranks that operate the brake bands, each crank or arm being equipped with an adjusting nut. The diaphragm pressure system herewith described and claimed eliminates all cylinder pistons, and packings of rubber flare washers, the only moving part being the diaphragms constructed in pairs so that a double expansion can be assured, and at the same time produce a safe and reliable device in which sticking and leakage is reduced to a minimum. The diaphragms are held in spaced relationship by sealed joint members. A master cylinder, used in conjunction with this four-wheel pressure diaphragm brake system is formed in such a manner as to be air proof and containing the packing elements on the front end, which faces the front end of the foot pedal, while the piston is equipped with a plurality of brass expansion rings to insure a positive, high and tight pressure of oil in the lines leading to the diaphragm. The back end of the cylinder has one lead or line extending therefrom with a T branch line extending to the right and left sides of the chassis, which, in turn, is distributed to all four wheels. On each end of the line leading to each wheel is provided a shut-off valve to be used in case of any injury to the diaphragm on any one of the wheels. The system is provided with a tank for oil, approximately one pint capacity, which is constructed without washers or threads.

In operation, the piston in the oil tank may be lifted by hand, approximately two and one-half inches, which will, under ordinary circumstances, lift it above the level of the bottom of the tank, clear of a plurality of holes in the cylinder, thereby allowing the lower portion of the cylinder to fill with liquid or oil, and by a pressure on the downward stroke, the piston closes the holes in the cylinder and forms a sealed chamber therebelow, and the remaining pressure forces liquid in the master cylinder through the lines to the diaphragms. The lower end of the cylinder is adapted to be efficiently sealed by a check valve of some suitable type, to prevent the return of the liquid to the reserve tank mounted on the dash of the car or truck. This diaphragm oil pressure system is preferably operated entirely by a non-freeze oil, cushion and pressure created by means of a master cylinder pressure device.

The pressure of oil on the system determines the position of the foot brake lever; when the system is full, the lever is forced into position for immediate service.

When the system is ready for use, that is, free of air, and replenished with the liquid, and the brake is applied creating the pressure in the lines, the same pressure will reverse in lines, having a tendency to keep the pedal in position, also a small pull spring 75 is attached to eliminate any vibration due to slack in the pedal.

It is to be understood that alterations and substitutions may be made in the above disclosure within the scope of the claims without affecting the merits of this invention.

What I claim is:—

1. A liquid pressure brake, comprising a plurality of diaphragms spaced apart, a main body portion, clamping members detachably connected to the main body portion, the diaphragms being firmly held therebetween, lever arms extending from the main body portion, head members firmly held in the diaphragms, adjusting elements attached to the head members for bringing tension on the lever arms.

2. A liquid pressure brake, comprising a plurality of diaphragms spaced apart, a main body portion, clamping members detachably connected to the main body portion, the diaphragms being firmly held therebetween, lever arms extending from the main body portion, head members firmly held in the diaphragms, adjusting elements attached to the head members for bringing tension on the lever arms, the lever arms being pivotally mounted on the main body portion.

3. A liquid pressure brake, comprising a plurality of diaphragms spaced apart, a main body portion, clamping members detachably connected to the main body portion, the diaphragms being firmly held therebetween, lever arms extending from the main body portion, head members firmly held in the diaphragms, adjusting elements attached to the head members for bringing tension on the lever arms, the lever arms being pivotally mounted on the main body portion, an opening in the main body portion for admitting liquid between the diaphragms.

In testimony whereof I affix my signature.

JOHN LANSINGER.